United States Patent [19]

Fitzgerald et al.

[11] 3,754,120

[45] Aug. 21, 1973

[54] APERTURED CARD READER AND DIGITAL DATA COLLECTION SYSTEM

[75] Inventors: James R. Fitzgerald, New Hope; Ronald G. Beachem, Mound, both of Minn.

[73] Assignee: Incremental Systems, Inc., Minneapolis, Minn.

[22] Filed: Nov. 3, 1970

[21] Appl. No.: 86,473

[52] U.S. Cl.... 235/61.11 E, 235/61.8 R, 235/92 ST

[51] Int. Cl. .............................................. G06k 7/10

[58] Field of Search ................ 235/61.8 R, 61.11 E; 250/219; 58/33

[56] References Cited

UNITED STATES PATENTS

| | | | |
|---|---|---|---|
| 3,582,617 | 6/1971 | Berler | 235/61.11 E |
| 3,456,117 | 7/1969 | Ritzert | 235/61.11 E |
| 2,548,460 | 3/1951 | Hall | 235/61.8 R |

*Primary Examiner*—Maynard R. Wilbur
*Assistant Examiner*—Robert F. Gnuse
*Attorney*—Daniel J. Meaney, Jr.

[57] ABSTRACT

An apertured card reader adapted for converting information stored in an information bearing portion of an apertured card into digital signals as the apertured card is manually transported within the reader is shown. In one embodiment, the apertured card reading apparatus includes an input sensing means which is responsive to the apertured card being selectively inserted along a path a predetermined distance within the reader for starting the reading means which converts the stored information into a digital signal having characteristics determined by the rate at which the information bearing portion of the card is manually transported past the reading means and for disabling the reading means when the apertured card has been manually transported therepast.

A digital data collection system capable of converting information stored on apertured cards into digital signals representing the stored information wherein the system includes a counter scanning unit, a digital recorder, a recorder counter, a digital clock and clock gating means for recording on the strip member digital data representing information stored on at least one of said apertured cards read by a card reader and information representing the time and data said stored information was recorded on said strip member also shown.

9 Claims, 16 Drawing Figures

Patented Aug. 21, 1973 3,754,120

6 Sheets-Sheet 1

INVENTORS
JAMES R. FITZGERALD
BY RONALD G. BEACHEM
Daniel J. Meaney, Jr.
Allan O. Maki
ATTORNEYS INVENTORS
JAMES R. FITZGERALD
RONALD G. BEACHEM
BY Daniel J. Meaney, Jr.
Allan O. Maki
ATTORNEYS INVENTORS
JAMES R. FITZGERALD
RONALD G. BEACHEM
BY Daniel J. Meaney, Jr.
Allan O. Maki
ATTORNEYS INVENTORS
JAMES R. FITZGERALD
RONLD G. BEACHEM
BY Daniel J. Meaney, Jr.
Allan O. Maki
ATTORNEYS INVENTORS
JAMES R. FITZGERALD
RONALD G. BEACHEM
BY Daniel J. Meaney, Jr.
Allan O. Maki
ATTORNEYS INVENTORS
JAMES R. FITZGERALD
BY RONALD R. BEACHEM
Daniel J. Meaney, Jr.
Allan O. Maki
ATTORNEYS

APERTURED CARD READER AND DIGITAL DATA COLLECTION SYSTEM

The apertured card reader of the present invention is particularly adapted for use as an input terminal to a data collection system. Typical data collection system input terminals include mechanical means for receiving an apertured card containing stored information typically one of the apertured cards is an employee badge or the like. After the card has been inserted into the reader, the employee is normally required to manually set dials and the like on the input station in order to program additional work data which is to be stored together with the employee data, into a computer or onto punched paper tape. After the card is properly inserted into the input station and the additional data is programmed in the card reader, the employee then activates the card reading apparatus to store the data. One such typical system is disclosed in U.S. Pat. No. 3,303,472.

Generally most card readers require that the punched card, containing the stored information, be inserted to the card reader and locked in a card reading position before the 19 cycle is electrically initiated.

For example, U.S. Pat. No. 3,132,241 discloses a badge reading apparatus for reading information stored as perforations in a punched card. When the badge, in the form of a punched card, is inserted into the reader, a slider engages the punched holes and slides with the card until the card is fully inserted into the reader and latched in read position. The information is read from the punched card by the coincidence of slideable bifurcated electrical spring contacts located as part of the slider and an array of vertical and horizontal conductors.

Another U.S. Pat., No. 3,340,384 is a card reader having a slideable tray which receives and mechanically transports the punched card into reading position. The slideable tray has a plurality of spaced and electrically conductive sensing elements adapted to pass through the perforations and make electrical contact with the opposed aligned electrically conductive bars enabling a readout of data by coincidence of the conductors.

Another punched card reader which operates on a principle of coincidence of electrical contacts is shown in U.S. Pat. No. 3,352,981. In this punched card reader, the punched card is placed in a slideable tray. As the slideable tray containing the punched card is pushed into read position, the tray exerts a wedging pressure causing a wiping action between the electrical conductors passing from the reader thereby the perforations in the card and wiping electrical contact with the opposed aligned conductive bars in the tray. Data is read from the reader by the coincidence of the electrical conductors.

Typical punched card readers having photocells for reading data from punched cards after the same are locked in reading position are shown in U.S. Pat. Nos. 3,419,881; 3,308,276; and 3,328,589. A reading station formed of fiber optics for reading information from punched cards is shown in U.S. Pat. No. 3,335,265.

Other card reading apparatus adapted for reading information from embossed and encoded cards after the same are in reading position are shown in U.S. Pat. No. 3,299,298 and U.S. Pat. No. 3,358,124 respectively.

It is also known to mechanically transport a punched card past a plurality of photocells aligned in a row and to convert the information stored therein into a digital signal. If the punched card is transported past the reading means, e.g. photocell aligned in a row, at a non-uniform rate, a separate clock generating means responsive to the trailing edge of the card may be used to generate the desired clocking signal having non-uniform periods. Such a punched card reader having such a clock generating means is shown in U.S. Pat. No. 3,238,357.

Each of the foregoing card reading apparatus either requires the card containing the information to be locked in reading position or be mechanically transported past the reading means.

The resulting mechanical handling equipment must be specially designated to close tolerances. The control systems for the reading means of necessity become complicated when the card reading apparatus is incorporated into a data collection system, viz, U.S. Pat. No. 3,303,472.

U.S. Pat. No. 3,419,881 teaches a recording control apparatus which includes a card reader for reading, in a programmed sequence, two cards containing information. One card is an employee identification card and the other card is a reason card. This reading control apparatus is used to control movement of employees through entrances and exits; the reading control apparatus automatically record information such as employee identification data at certain times as well as time information from a clock. Each card reader is considered a separate unit and does not record data from the reason card nor include means for controlling transfer of any digital data to the recorder.

The present invention overcomes the disadvantages of the prior art card reading apparatus. For example, the present invention does not require mechanical sliding trays, spaced electrical contacts and the like.

In one embodiment of the present invention, information is read from a punch card as the card is manually transported, in a predetermined manner, within the card reader. When the information bearing portion of the card has been manually transported past the reading means, the data therefrom is already transmitted to a storage means, such as, for example, a magnetic tape recorder.

One advantage of the present invention is that a multi-stage card reader can be constructed wherein a plurality of or a set of apertured cards containing stored information used in a programmed sequence is used to program the input station or card reader thereby eliminating separate switches, potentimeters and the like and its associated problems encountered in using operator settable switches and the like.

One application of the present invention is that an apertured card reading apparatus can be used as an input to a data collection system.

In manufacturing plants, offices and the like, it is desired to correlate employee time with the time spent on particular jobs, assignments and the like.

By using the teachings of the present invention, one can assign each employee a permanent employee badge containing certain information about the employee as apertures arranged in a predetermined array such as, for example, an employee number and job classification. In addition, as a job or assignment is accepted by an employee or is to be assigned to or per-formed by an employee, the particular job is assigned a permanent job card containing certain information about the job as apertures arranged in a predetermined array, such as, for example, a job number. In such a system, when an employee starts work on or finishes a job, he merely manually inserts his employee badge into the employee badge reading stage of the card reading apparatus. The information contained in the card is converted into digital signals as the information bearing portion of the employee card is manually transported past the employee badge reading means. Similarly, the job card is manually inserted into the job card reading stage of the card reading apparatus. The information contained in the job card is converted into digital data as the information bearing portion of the job card is manually transported past the job card stage reading means.

It is contemplated that the desired data information may be stored on the cards in forms other than punched holes or apertures, such as, for example, embossing, magnetic inked symbols, magnetic symbols or graphic information capable of being read by optical scanners.

If the employee card reader and job card reader are used as input terminals to a digital data collection system, the information stored on the apertured cards may be recorded on a strip member as digital data.

In the digital data collection system disclosed herein, a counter scanning unit operatively connected to the card readers controls the transmitted digital signals from the readers when an inhibit signal disables the scanning sequence of the counter scanning unit for the period required to read the apertured cards.

A digital recorder, included as part of the system, records digital signals, representing the information stored on the apertured cards, as digital data on a strip member, such as, for example, a magnetic tape.

A recorder counter unit is included as a component of the digital data collection system and controls transmission of digital signals to the digital recorder for recording. The counter unit determines the beginning and end of a digital signal transmission from a card reader.

A digital clock is included within the data collection system for generating digital signals representing time and date. The digital clock is controlled by a clock gating means which controls the transmission of digital signals from the digital clock to the digital recorder. The digital recorder records the date and time as digital data on the magnetic tape together with the digital data representing the information stored on the apertured card. The digital recorder, at the end of a transmission of digital signals from a card reader, will have recorded on the strip member digital data representing information stored on at least one of the apertured cards read by a card reader and information representing the time and date said stored information was recorded on the strip member.

It is one object of the present invention to disclose an apertured card reading apparatus adapted to convert information stored in the form of apertures in a card into digital signals representing the stored information as the information bearing portion of the card is manually transported within the reader.

It is another object of the present invention to provide a novel method for converting information stored in a punched card into digital signals having characteristics determined by the rate at which the information bearing portion of the card is manually transported past the reading means.

Yet another object of the present invention is to provide a novel digital data collection system capable of recording digital signals from a plurality of card readers as digital data on a strip member together with digital data representing time and date information.

These and other objects of the present invention will be readily apparent when considered in light of the description of the preferred embodiment taken together with the drawing wherein.

The description of the preferred embodiment herein will first consider the overall digital data collection system.

Figure 1:
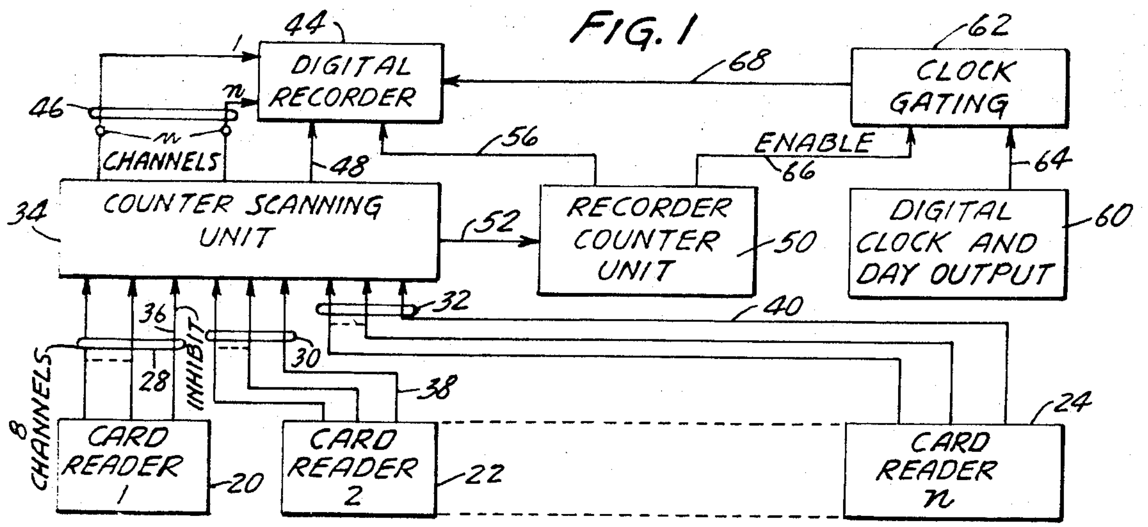
FIG. 1 is a block diagram illustrating a digital data collection system utilizing card reading apparatus of the present invention as an input terminal.

Referring now to FIG. 1, the digital data collection system set forth herein includes a first reading apparatus 20, a second card reading apparatus 22 up to an *n* card reader designated as 24. Each card reader, 20, 22 and 24, has digital signal communication links 28, 30 and 32 respectively of *n* channels each.

The communication links 28, 30 and 32 are electrically connected to a counter scanning unit 34. The counter scanning unit 34 may be a time division multiplexing circuit which samples each of the communication links in a programmed sequence.

In addition to the communication links of *n* channels each described above, each card reader 20, 22 and 24 includes an inhibit channel identified as 36, 38 and 40 respectively. The inhibit channels 36, 38 and 40 are electrically connected to the counter scanning unit 34. When a card reader is ready to transfer digital signals via its communication channel to the counter scanner unit 34, the card reader generates an inhibit signal which is transmitted to the unit 34 to stop the scanning sequence and enable the unit 34 to direct the card reader to transmit digital signals.

The counter scanning unit 34 is connected to a digital recorder 44 via communication link 46 and control channel 48. The digital recorder may be a magnetic tape recorder which is capable of recording digital data in the form of seven bits of information across each track wherein the first six bits represent the stored information with the seventh bit being a parity bit.

The digital recorder 44 is controlled by a recorder counter unit 50 which is electrically connected to the counter scanner unit 34 via control circuit 52. In addition, the recorder counter unit 50 is connected to the digital recorder 44 by control circuit 56. The recorder counter unit 50 controls transmission of digital signals between the counter scanning unit 34 and the digital recorder 44 via communication link 46.

The counter scanning unit 34 may be considered as a free running time division multiplex circuit which sequentially samples the communication links 28, 30 and 32 to card readers 20, 22 and 24 respectively. When a card reader has a set of apertured cards inserted therein and is ready to transmit digital singals via the counter scanning unit 34 and communication link 46 to the digital recorder 44, the appropriate card reader generates an inhibit signal which stops the scanning sequence and locks the counter scanning unit 34 unto the particular communication link.

For example, if car reader 20 generates an inhibit signal on its inhibit channel 36, the counter scanning unit 34 scanning sequence would be stopped when it samples communication link 28. When this occurs, the counter-scanning unit 34 is electrically connected to communication link 46 to the digital recorder 44. When the recorder counter unit 50 determines that the digital recorder 44 is ready to record data, the recorder counter unit 50 directs the counter scanning unit 34 to transmit digital signals. Concurrently, the recorder counter unit 50 directs the digital recorder 44 to record the digital signals as digital data on a strip member (not shown). At the end of the digital signal transmission, the recorder counter unit 50 releases the counter scanning unit to begin its scanning sequence until another inhibit signal is received.

In addition to recording of the digital signals representing the information stored on the apertured card, the digital data system includes circuitry for recording time and date information.

In particular, the system includes a digital clock and day output unit 60 which, generates digital signals representing the time and date. The digital clock and day output unit 60 is electrically connected to a clock gating means 62 via communication channel 64.

The clock gating means 62 is connected to and controlled by the recorder counter unit 50 via control channel 66. When the clock gating means 62 is enabled by recorder counter unit 50 via control channel 66, digital signals representing time and date information are transmitted via communication channel 68 to the digital recorder 44.

Thus, the digital data ultimately recorded on a strip member by digital recorder 44 includes information stored on at least one of the apertured cards read by a card reader and information representing the time and date said stored information was recorded on the strip member.

Alternatively, it is contemplated that the cards could be read on insertion. For example, the logic and control circuitry could be designed such that the employee card 72 is read as it is inserted into card reading stage 86. After employee card 72 has been fully inserted, the job card 74 is then inserted into the job card reading stage 88, and the job card 74 is read on insertion. Thereafter, both cards may be withdrawn.

In any event, it is important that the information bearing portion of the card be read as the same is manually transported past the reading means. For purpose of establishing a logical sequence for explanation, the sensors and other electronics associated with the employee card shall be hereinafter referred to as 'A'; e.g. 'A' card solenoid; and those associated with the job card shall be hereinafter referred to as 'B'; e.g., 'B' card solenoid.

Figure 4:
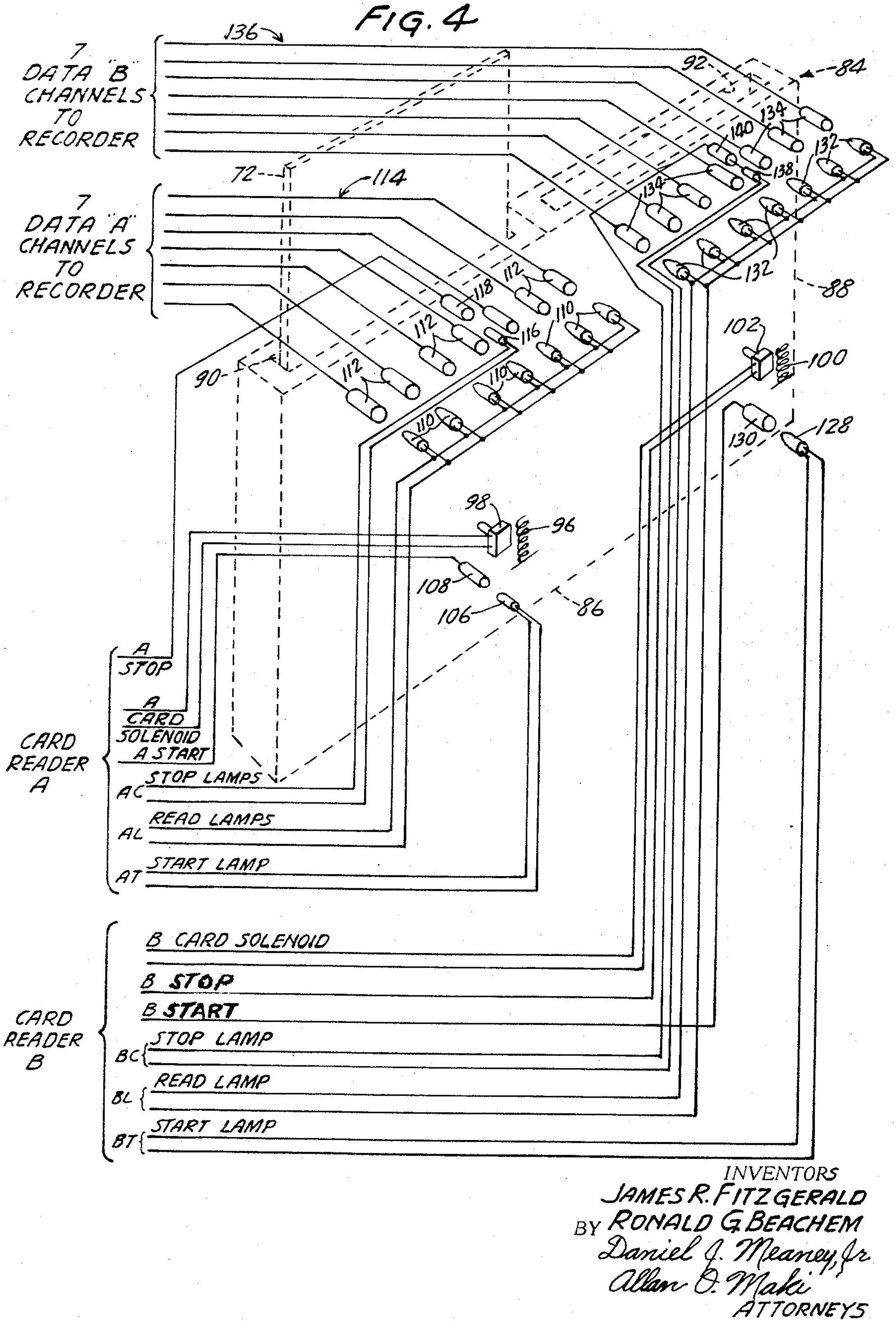
FIG. 4 is a pictorial representation partially in schematic illustrating one embodiment of the card reading apparatus of the present invention.

In FIG. 4, the card 72 is inserted with its beveled corner 78 positioned on the outside bottom edge. If desired, a detection means may be utilized to logically determine if the card is properly inserted. As the card 72 is manually inserted into the reader along the predetermined path, the leading edge of the card 72 compresses a spring 96 until the top of the card 72 is substantially flush with the top of the card reader. An 'A' card holding solenoid 98 holds the spring 96 in compressed position until the employee card reading stage 86 is ready to be actuated.

In a similar manner, and after employee card 72 is inserted into the employee reading stage 86, the job card 74 is then inserted into job card reading stage 88. Likewise, the card 74 compresses a spring 100, which spring is held in compressed position by a 'B' card holding solenoid 102. Both the 'A' card holding solenoid 98 and 'B' card holding dolenoid 102 hold springs 96 and 100 respectively in compressed position until the counter scanning unit 34 determines that the employee card reader 86 and the job card reader 88 are in a reading mode. When the card reader 86 and 88 are ready to transmit digital signals, an inhibit signal is generated to stop the counter scanning unit 34.

Figure 5:
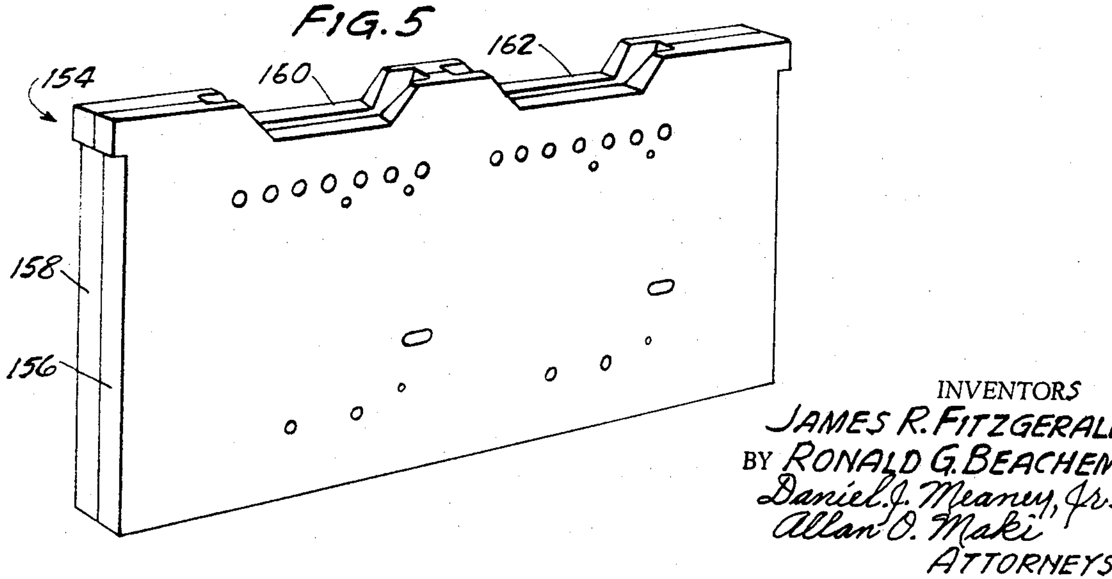
FIG. 5 is an isometric view of a multistage card reading housing illustrating an employee card reading stage and a job card reading stage.

As the end 72 has been inserted a predetermined distance into the employee card reading stage 86, the card passes between an 'A' card start control means which in this embodiment comprises 'A' start lamp 106 and an 'A' start photocell 108 is connected to a read control means as shown in FIG. 5.

The information bearing portion of the card 72, in this embodiment, is to be read and converted to digital data as the operator manually removes the same from the card reader. After the 'A' card holding solenoid 98 is activated permitting the spring 96 to be released, the spring 96 urges the card upward so that the top poition of the card extends far enough out of the reader to enable the operator to grasp the edge of the card and manually withdraw the same from the card reader. When the card 72 has been urged by spring 98 into withdrawal position, the read control means of FIG. 5 then enables or actuates the reading means.

In the embodiment of FIG. 4, the reading means includes seven lamps 110 aligned in a row and seven photocells 112 aligned in a spaced opposed relationship from the lamps 110 a distance to permit the employee card 72 to pass therebetween. The output from the photocells 112 are transmitted via 'A' data channels 114 and the counter scanning unit 34 to the digital recorder 44.

After the information bearing portion of the punched card has been manually transported past the reading means, the leading edge of the card then actuates a stop control means, which in this embodiment is an 'A' stop lamp 116 and an 'A' stop photocell 118. The stop control means disable or deactivate the reading means; namely, the 'A' read lamps 110. Thus, the ready means is enabled until the punched card has been transported past the reading means at least a distance equal to the length of the information bearing portion of the punched card.

After the employee card 72 has been read by the employee card reading stage 86, the control electronics actuates an unlocking means or solenoid 102 to permit withdrawal of the job card 74 after the employee card 72 has been read.

Figure 3:
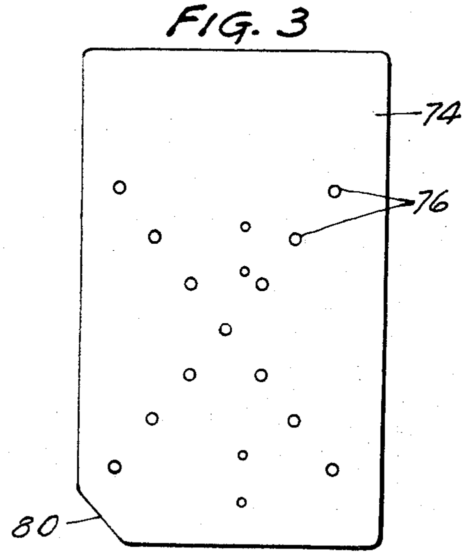
FIGS. 2 and 3 are diagramatic frontal views illustrating a typical employee card and job card respectively which can be read by the card reading apparatus of the present invention.
Figure 2:
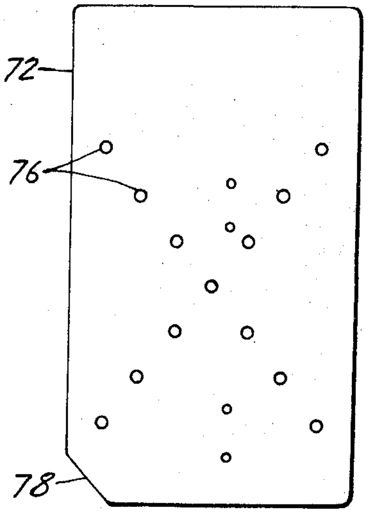

When job card solenoid 102 is actuated, the job card 74 (of FIG. 3) already inserted through inlet 92 with the beveled corner 80 in the lower left hand corner as illustrated in FIG. 3, is permitted to move upward in the card reader such that the top of the job card 74 extends slightly out of opening 92 to enable the operator to grasp and manually withdraw the job card. The leading edge of the job card passes between a 'B' start control means formed of a 'B' start lamp 128 and a 'B' start photocell 130. The control electronics,shown in FIG. 9, actuates the read means which in this embodiment comprising 'B' read lamps 132 and 'B' read photocell 134. As the information bearing portion of the job card is manually transported past the reading means, digital signals having characteristics determined by the rate at which the information bearing portion of the card is manually transported past the reading means is transmitted via 'B' data channels 136 and the counter scanning unit 34 to the digital recorder 44.

When the leading edge of the job card reaches the 'B' stop control means, comprising a 'B' stop lamp 138 and 'B' stop photocell 140, the reading means are deactivated since the data from the card has been transmitted to the recorder. Both cards may then be withdrawn from the card reading apparatus.

FIG. 5 (on sheet 1) is an isometric view illustrating a housing 154 which is relatively simple mechanically and which can be formed of plastic, bakelike or other type material. The housing 154 can be formed of two thin rectangular shape front members 156 and back member 158. Front member 156 and back member 158 have apertures formed therein to receive the card stop switches, the start and stop control means and the reading means.

Figures 6, 7, 8, 10:
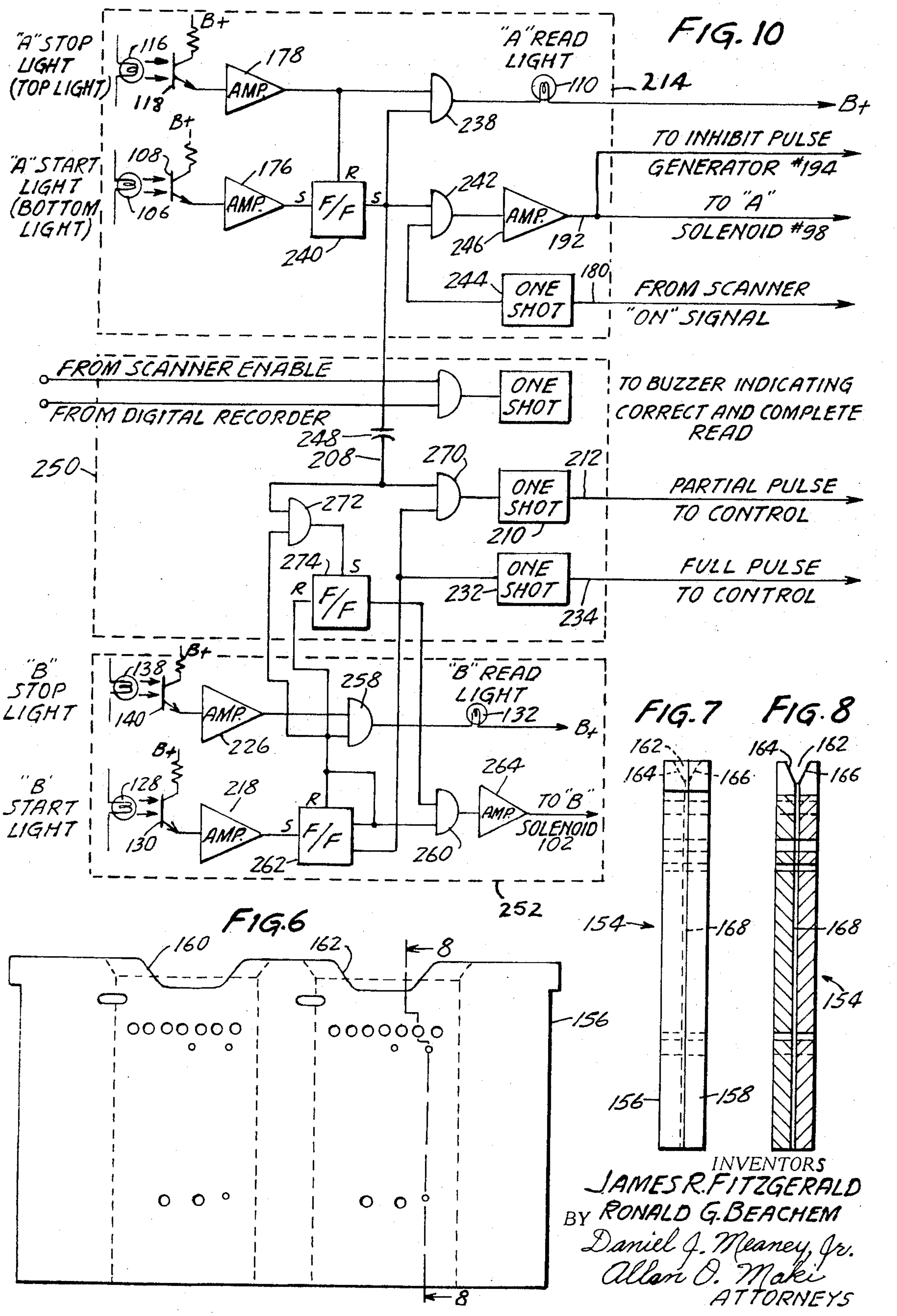
FIG. 6 is a front view of the multistage card reader of FIG. 5.
FIG. 7 is a right end view of the multistage card reader of FIG. 6.
FIG. 8 is a sectionaly view taken along section line 8—8 of FIG. 6.
FIG. 10 is a logic diagram illustrating one embodiment for the block diagram of FIG. 9.

FIG. 6 (on sheet 4 of the drawing) shows a front view of front member 156. Front member 156 has a hollowed interior starting at an inlet 160 for the employee card reading stage and inlet 162 for the job card reading stage. This is also shown on FIG. 5. As mentioned hereinbefore, the dimensions as to depth or thickness and width of the inlets are matched to the dimensions of the particular card to be read by the associated reading stage.

FIG. 7 is a right end view of the housing 154 illustrated in FIGS. 5 and 6. From FIG. 7, it is shown that the inlet 162 has a 'V' shape formed by sloping walls 164 and 166 of members 156 and 158, respectively, in order to precisely direct the job card into a hollowed-out passageway or path 168 through which the job card is manually transported.

The section view of FIG. 8, taken along Section 8—8 in FIG. 6, discloses the job card reading stage in greater detail. The job card reading stage has a construction similar to that of the employee card reading stage. The inlet 162 is 'V' shaped and formed by sloping walls 164 and 166 of members 156 and 158 respectively. The predetermined path or passageway 168 is shown in greater detail.

The location, sizing, etc., of the various apertures to accomodate the control means and reading means described in connection with FIG. 4 is determined by the particular application and cards and a detailed description of dimensions, aperture diameter, locations and relationship between reading means locations and location of aperture in an aperture card is not deemed necessary.

Figure 9:
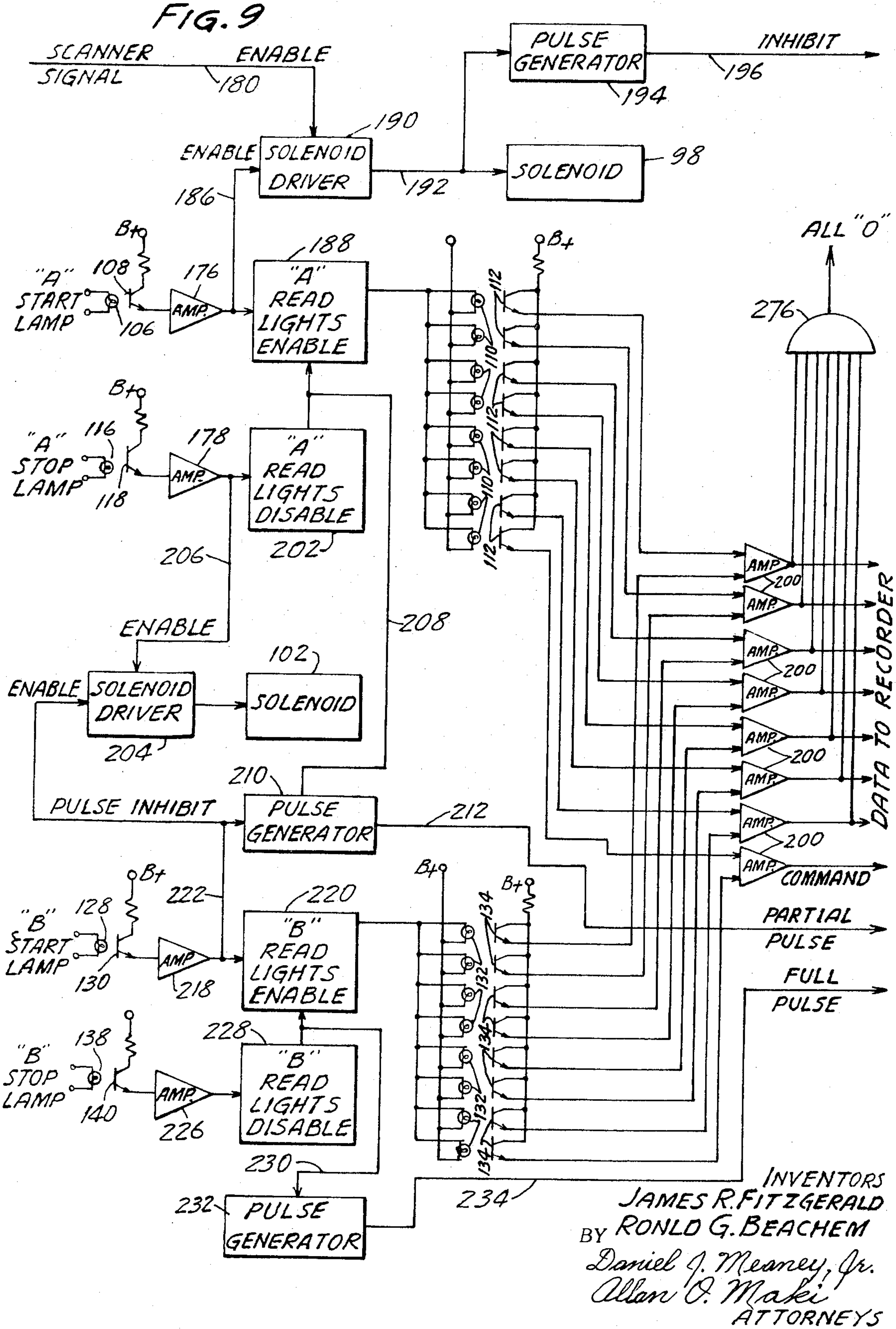
FIG. 9 is a block diagram partially in schematic illustrating the control electronics for the multistage card reading apparatus.

FIG. 9 (on sheet 3 of the drawing) is a block diagram partially in schematic form combining the components described in FIG. 4 with the control circuitry in order to electrically and logically perform the control and reading steps. The numerals used to identify the card switches, the various lamps and photocells are retained in this description.

In acquiescent state, the 'A' card reading stage 86, 'A' start lamp 106 and 'A' photoresponsive means 108 are aligned or positioned relative to each other such that in the absence of a card inserted therebetween, the light energy from lamp 106 impinges on photoresponsive means 108. Photoresponsive means 108 produces an electrical signal which is applied to an amplifier 176.

Similarly, the 'A' stop lamp 116 and 'A' photoresponsive means 118 are aligned or positioned relative to each other, such that in the absence of a card therebetween, photo energy from lamp 116 impringes on photoresponsive means 118. Photoresponsive means 118 produces an electrical signal which is applied to an amplifier 178.

The counter scanning unit 34, which may be a time division multiplexing circuit, produces scanning signals which are sequentially applied to each card reader in a programmed or time sequence. For example, scanning signals are applied via lead 180 to the control means of the employee card reading stage 86.

The lamps and photoresponsive means for the 'B' card reading stage function in a similar manner. The photoresponsive means 130 produces an electrical signal which is applied to an amplifier 218. The electrical signal generated by photoresponsive means 140 is applied to an amplifier 226.

The outputs of amplifiers 176 and 178 are the means for enabling and disabling the reading means. The control circuitry will now be described.

The output from aplifier 176 is normally at a first level in the absence of a card. When an employee card is inserted therebetween, a pulse is generated by the card interrupting the light energy. The pulse is amplified by the amplifier 176 and applied to an 'A' read light enabling circuitry 188. The output pulse or signal from amplifier 176 is also applied via a lead 186 to a solenoid driver 190, which control in turn actuates solenoid 98 in FIG. 4.

In addition, a scanner input 180 is utilized to actuate the solenoid driver 190 in cooperation with control lead 186 from amplifier 176. When the counter scanning unit 34 of FIG. 1 sequences to time sample the status of the 'A' card reader, the combination of scanning signal from the scanning unit on lead 180 and the pulse from amplifier 176 on lead 186 function to stop or inhibit the scanning unit. When the scanning signal pulse on lead 180 and a start signal on lead 186 occur simultaneously, the solenoid driver 190 is actuated and applies a control signal on lead 192. This control signal actuates solenoid 98 (of FIG. 4) and a pulse generator 194. The pulse generator 194 generates an inhibit signal. Generator 194 may be a one shot monostable multivibrator having a rest time which is of sufficient length to permit an operator to withdraw both cards for readout. The inhibit signal is applied via a lead 196 to the scanning unit 34. Thus, the inhibit signal is used to momentarily stop sequential operation of the scanning unit 34 permitting the transfer of digital information to the digital recorder 44.

Typically, the employee card 72 is inserted into reading stage 86 and the job card 74 is immediately inserted into reading stage 88. Thus, at the time the scanning unit 34 receives and is momentarily stopped by the inhibit signal on lead 196, both the employee card 72 and the job card 74 have been inserted into their respective units. However, if not, or if only a single card is removed, appropriate pulse signals are generated and transmitted to the digital recorder 44.

The enable circuitry 188, when enabled by a pulse from amplifier 176, increases the intensity of or turns on lamps 110 to permit readout of information as the employee card 72 is withdrawn.

As the information bearing portion of the employee card is manually transported between lamps 110 and photocells 112, the presence of apertures in the various rows and columns of the cards generate electrical pulses, from the photocell, representing the stored data. The pulses are amplified by amplifiers 200 and applied via the data channels to the recorder. In addition to the seven channels considered in FIG. 4, an eighth channel for transmitting a step command signal to the recorder has been added. The step command is generated by the addition of an appropriate aperture in the punched cards.

The leading edge (bottom on withdrawal) of the employee card then permits light from the 'A' stop lamp 116 to impinge on the 'A'stop photocells 118 generating a pulse indicating that the information bearing portion of the employee card 72 has been manually transported past the reading means. Photocell 118 generates a control pulse which is applied via amplifier 178 to an 'A' read light disable control means 202 and via a lead 206 to a 'B' card solenoid driver 204. The 'A' read light disable control means 202 overrides the 'A' read light enable control means 188 and function to deactivate lamps 110. At this point the card reading apparatus has transmitted the employee card information to the recorder and the reader then waits for the operator to perform the next operation; namely, withdrawing a job card.

Concurrently, the 'A' read light disable circuit 202 applies a control signal via lead 208 to a pulse generator 210. Pulse generator 210 performs the function of generating a first pulse or partial pulse on lead 212 which is applied to the digital recorder 44 indicating that the employee card has been read. The partial pulse signal is overridden by the 'B' read sequence resulting in transmission of a full pulse.

Concurrently, the output signal from amplifier 218 is applied via lead 222 to the pulse generator 210 and to the solenoid driver 204.

The 'A' stop signal applied via lead 206 to solenoid driver 204 actuates solenoid 102 permitting the job card 74 to be withdrawn in a manner similar to that for the employee card 72.

As the leading edge of the job card reaches the 'B' start light 128 and start photocell 130, the photocell 130 generates a control pulse which is applied via an amplifier 218 to a 'B' light enable control means 220. The control means 220 then enables the 'B' read lights 132 in a manner similar to that described for the 'A' read sequence.

The 'B' start signal generated by photocell 130 and amplified by amplifier 218 is also applied by lead 222 to the solenoid driver 204 and the pulse generator 210. Solenoid driver 204 then enables solenoid 102 since the employee card is being withdrawn. The pulse generator 210 is disabled thereby overriding the partial pulse generated on lead 212.

As the job card is manually transported, the data stored in the job card is coverted into digital signals by photocells 134. The generated digital signals are amplified by amplifier 200 and transmitted over the data channels 136 to the digital recorder 44.

When the leading edge of the job card passes between the 'B' stop lamp 138 and photocell 140, photocell 140 generates a control signal which is applied via an amplifier 226 to a 'B' light disable control means 228. The 'B' light disable control means 228 then overrides the 'B' read light enable control means 220 to deactivate lights 132.

In addition, the 'B' read light disable circuitry 228 via lead 230 is connected to and controls a pulse generator 232. Pulse generator 232 generates a second pulse or a full pulse which is transmitted via lead 234 to the digital recorder 44. At this point, the entire reading sequence is completed, and the cards have been removed from the recorder.

The control circuit can be designed to respond to abnormal operations. For example, if an employee card is inserted into the reader, and subsequently removed and read without insertion and reading of a job card, the pulse generator 210 can be designed to have a predetermined reset time such that if a full control pulse is not generated only employee information is recorded together with time data. The use of solenoids essentially prevents the possibility of the job card 74 being withdrawn prior to the employee card 72 being withdrawn and read.

FIG. 10 is a logic diagram illustrating one embodiment for the control system in FIG. 9. The overall employee card control enclosed by dashed rectangle 214, include the 'A' read light enable control means 188 and and the 'A' read light disable control means 202 of FIG. 9 which may be formed by an AND gate 238 and a flip-flop 240 electrically connected such that the start pulse from amplifier 176 is electrically connected to the set input of flip-flop 240. The set output of flip-flop 240 is applied to one input of AND gate 238 and as an input to a second AND gate 242.

The second input to AND gate 238 emanates from amplifier 178. The output of amplifier 178 is also connected to and controls flip-flop 240.

The second input to AND gate 242 is produced from a one shot multivibrator 244 which is triggered from the scanner sampling pulse.

For purposes of example, circuit operation for the employee card 72 read sequence will be explained in detail.

When employee card 72 is in read position, spring member 96 (of FIG. 4) is compressed and solenoid 98 holds the employee card 72 within the reader. The scanning unit transmits a sampling signal to the card reader when the scanner is capable of controlling transmission of data from the card reader to the digital recorder 44.

With the employee card 72 in this position, light from lamp 106 and 116 are inhibited or interrupted from impinging on photocells 108 and 118. In this quiescent state, amplifier 176 applies a signal to the set input of flip-flop 240. The set output of flip-flop 240 conditions one input of AND gate 242. When a sampling signal is applied to the scanning lead 180, the one shot multivibrator 244 produces a triggering signal of a predetermined interval. For the predetermined time interval, both inputs to AND gate 242 are conditioned permitting the output from AND gate 242 to be enabled for the predetermined time interval. The output signal, or pulse, from AND gate 242 is amplified by an amplifier 246. The output from amplifier applied to lead 192 (of FIG. 9), which lead applies the signal to the 'A' solenoid 98 and the inhibit pulse generator 194.

Solenoid 98 is actuated permitting the employee card 72 to be slightly urged out of the reader as described.

As the employee card is withdrawn from the reader, AND gate 238 is conditioned by both inputs from amplifier 178 and flip-flop 240 enabling read lamp 110.

When the leading edge of the employee card 72 which is manually transported along the predetermined path within the card reader, passes by the lamp 116 and photocell 118 the output of amplifier 178 resets flip-flop 240 and disables AND gate 238 thereby disabling read lights 110.

The output from the set output of flip-flop 240 is applied via a capacitor 248 which produces a control pulse appearing on lead 208. This control pulse is used to control the pulse control means generally enclosed by dash rectangle 250.

The overall job card control, enclosed by a dashed rectangle 252, includes the 'B' read light enable control means 228 of FIG. 9 which may be formed by an AND gate 258, AND gate 260 and flip-flop 262. Connection and operation of the above is similar to that for the 'A' control means described above. The output of AND gate 260 is amplified by amplifier 264 and applied to solenoid 102. AND gate 258 controls 'B' read lamps 132.

The pulse control for generating the partial pulse or full pulse includes AND gate 270, AND gate 272 and flip-flop 274. The control pulse on lead 208 is simultaneously applied to one input of each AND gate 270 and 272. AND gate 270 controls triggering of pulse generator 210 to produce the partial pulse on lead 212.

AND gate 272 controls setting of flip-flop 274 to control actuation of solenoid 102. Flip-flop 262 of the 'B' control means enables the pulse generator 232 to produce a full pulse on lead 234.

Pulse generators 210 and 232 of FIG. 10 may be one shot multivibrators.

Figure 11A:
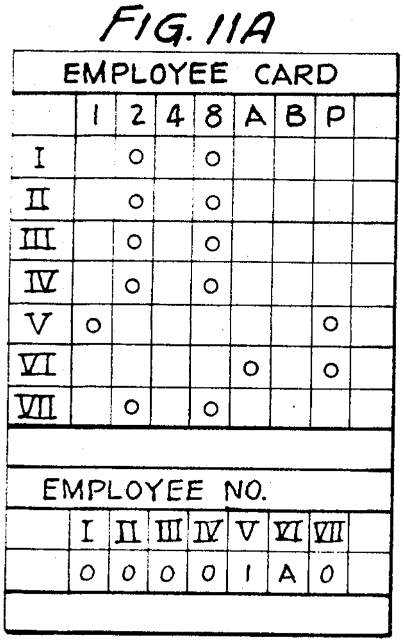
FIGS. 11A and 11B are diagrammatic representations of an apertured employee card and apertured job card containing an exemplary code.
Figure 11B:
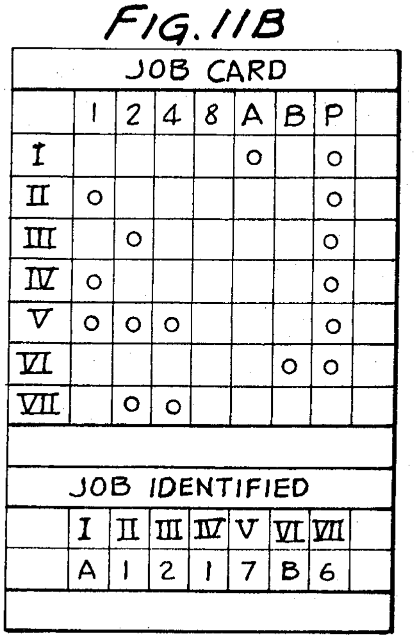

FIGS. 11A and 11B are an employee card and job card respectively which are punched illustrating an exemplary code. In FIG. 11A,the employee card has seven columns (reading left to right) which have the following legends:

1 2 4 8 A B P

The first six columns are programmable for data storage, and the seventh or 'P' column is a parity bit. For purpose of example, the parity bit will be punched as a '1' if the sum of the number of punched areas of preceding six bits in the row is an odd number.

Each row of information is identified by Roman Numeral I – VII. Coincidence of a column and a row position establishes a storage location. A punched hole or aperture may represent '1' and an unpunched hole may represent a '0'.

For the employee card in FIG. 11A, the assigned employee number is:

0 0 0 0 1 A 0

For the job card in FIG. 11B, the assigned Job Code is:

A 1 2 1 7 B 6.

Certain bits of the code can be used to represent other information as desired. The stored information can be programmed in any manner as is well known in the art.

Figure 12:
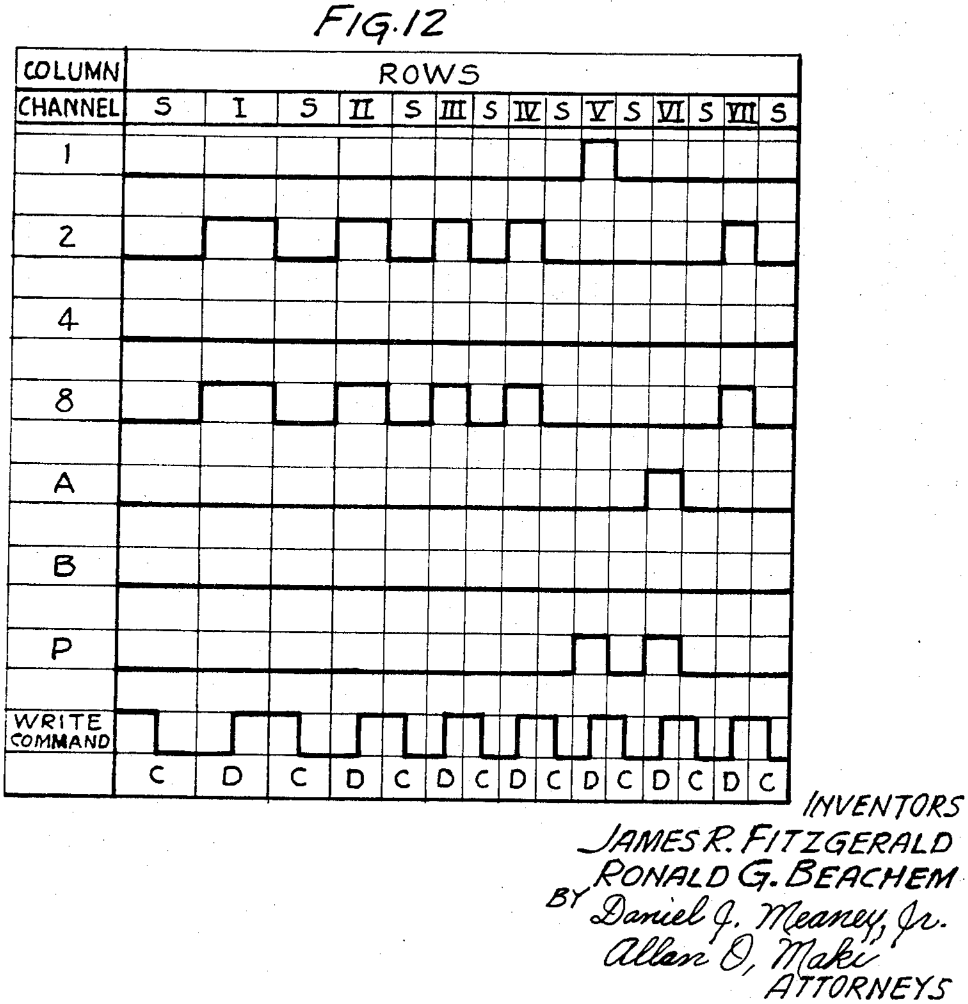
FIGS 12 and 13 are waveforms of digital signals generated by the multistage card reading apparatus for the apertured employee card and the apertured job card respectively generated by a reading operation occuring upon withdrawal of the cards.
Figure 13:
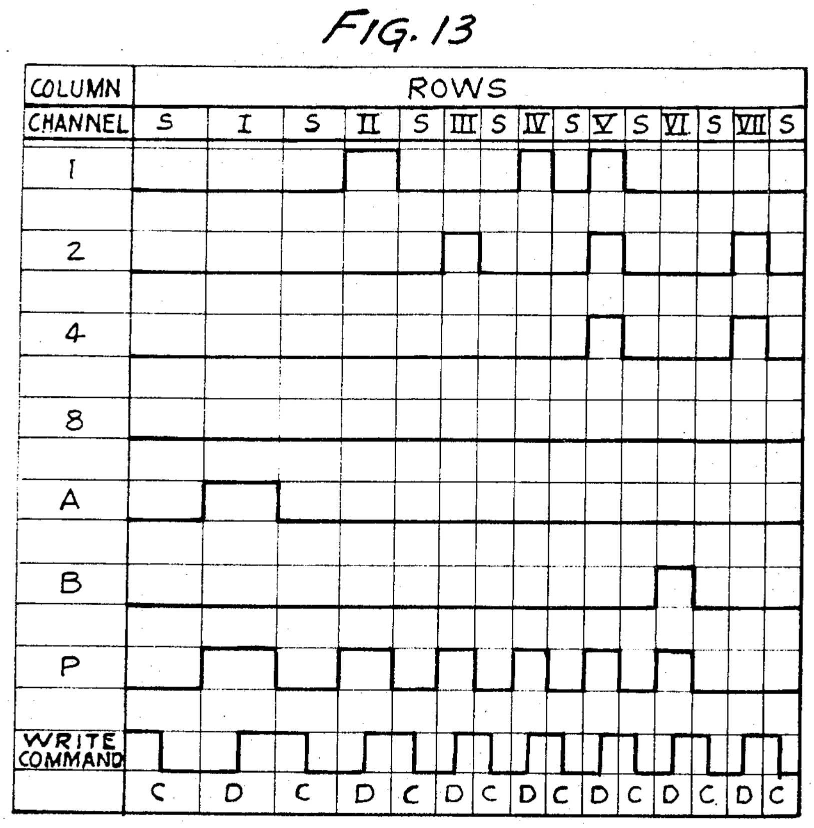

FIGS. 12 and 13 are waveforms of the digital signals generated by the photocells in response to an employee card and job card having stored information as illustrated in FIGS. 11A and 11B respectively as the cards are read on withdrawal.

For an example of operation, the employee card code of FIG. 11A and waveforms of FIG. 12 will now be briefly considered. When the employee card is inserted into the reader and is to be read on withdrawal, the stored information at the top of the card is read first. Initially all photocells will generate a zero until the first row, the I row, of information is read in parallel. In FIG. 12, at Row I, a pulse will be generated at bit positions 2 and 4 only. Thus, as each row of data is read by the card reader, digital signals will be generated as illustrated in FIG. 12 reading from left to right. Each row of data is the format of the information ultimately recorded in seven tracks on the magnetic media of the recorder.

Between each row of data punched on the card is a solid unpunched area of the card. When this part of the card passes by the photocells, each of the photocells generate a '0' which may be used as dynamic clocking. The write command waveform at the bottom of FIG. 12 and FIG. 13 represents such a signal.

By logically determinming the generation of '0's between each row, one can generate dynamic clocking signal. Such a self clocking circuit is shown in dashed lines and includes an exclusive or gate 276 in FIG. 9. Alternatively, the command signal can be generated by a punched clocking tracking on the card as illustrated in FIG. 9.

Also, when the card is first inserted in the reader, the card is initially moved slowly. But by the time the center of the card reaches the card reading means, the card is moved faster and approaches a somewhat uniform lineal speed. This variable reading rate results in generation of electrical pulses of non-uniform duration.

Thus, the waveforms in FIGS. 12 and 13 actually have a variable width.

For these reasons, the digital signals generated by the reading means will have a variable characteristic which is a function of the rate at which the card is manually transported past the reading means.

Figures 14, 15:
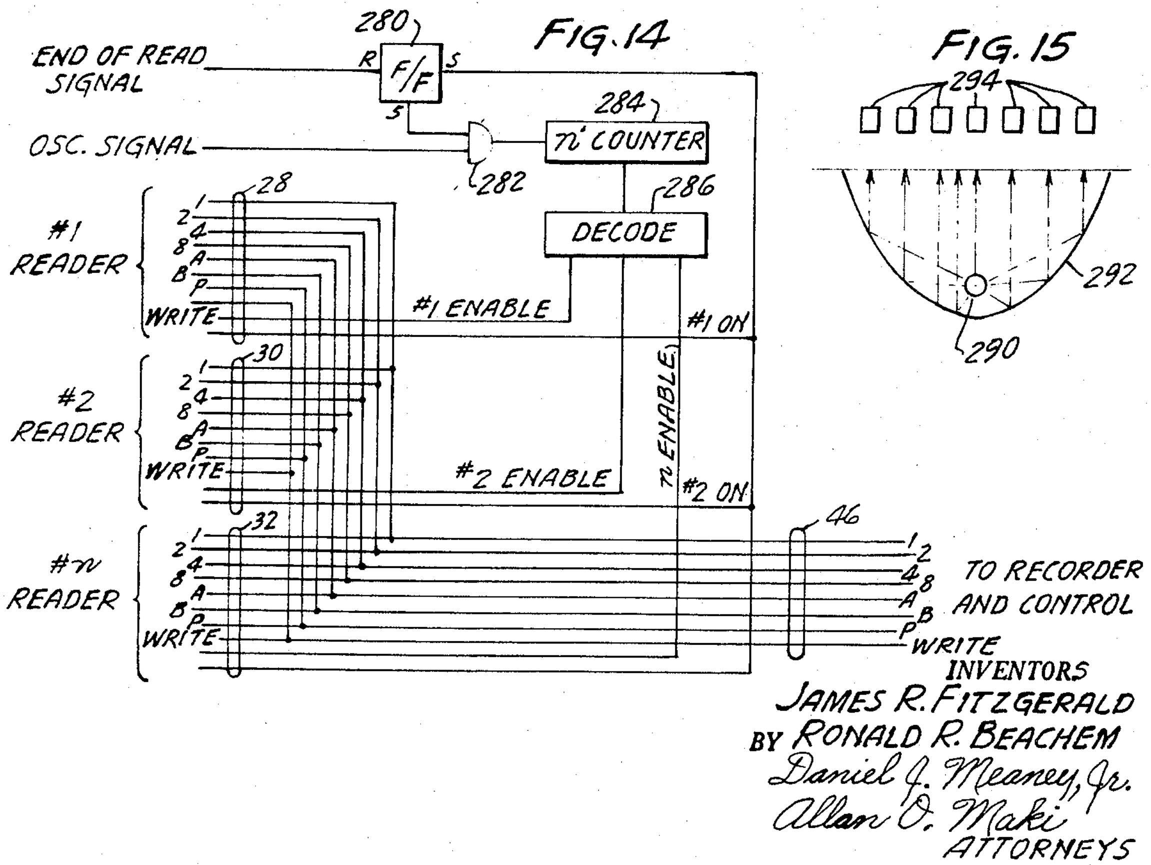
FIG. 14 is a logic diagram illustrating one embodiment of a counter scanning unit capable of being used in FIG. 1.
FIG. 15 is a diagrammatic illustration of one embodiment of an alternate photoelectric reader light source and sensor arrangement which can be used in the apparatus of FIG. 4 and FIG. 5 to practice the present invention.

FIG. 14 illustrates a logic diagram of a time division multiplexing circuit which can be used as the counter scanning unit 34 of FIG. 3.

The scanning unit 34 is electrically connected to each card reader via channels 28, 30 and 32, each channel including a plurality of individual channels for each 'bit' of digital data. Each individual channel is electrically connected to its associated similar channel from other readers. Thus, single channel 46 is capable of receiving and transmitting data from any actuated card reader.

The scanning unit control comprises a flip-flop 280 which is electrically connected to and controls an AND gate 282. The reset input of flip-flop 280 is controlled by the end of read signal produced by the digital recorder. The flip-flop 280 is set by the inhibit signal from the card reader being sampled. The AND gate 282 is conditioned by flip-flop 280 and the output of a clocking source. The AND gate 282 for the time interval it is conditioned, actuates an 'N' counter 284 having a number of sequential counts equalling the number of card readers having data channels connected to the scanning unit. The count generated by the 'N' counter 284 is applied to a decoder 286, which in turn generates and applies the enable signal, in a programmed sequence, to each reader.

FIG. 15 illustrates an alternative apparatus adapted for use as a photoelectric reader in FIGS. 4, 9 and 10. The photoelectric reader includes a light source 290, a parabolic reflective member 292 and a plurality of sensors 294.

The parabolic reflective member 292 is positioned relative to the light source 290 to produce a plurality of parallel light beams forming a band or ribbon of light. The photosensitive devices 294 are positioned in spaced alignment with the parabolic reflective member 292. The insertion of a card between the parabolic reflective member 292 and photosensitive devices interrupts the light rays and the light energy transmission is then controlled by the apertures in the card and the rate of movement of the card.

The invention has particular utility as a data collection system for a job shop or custom order type manufacturing operation. Historically it has been difficult to match employee time, part costs and the like to a particular job for cost control. When the data such as employee number and job number, time and date information is recorded in digital form on a magnetic tape, the magnetic tape can be used as a direct input into a programmed computer for processing and print out.

What is claimed is:

1. Apparatus for converting information stored in a punched card into digital electrical signals as said card is manually transported within said apparatus, said apparatus comprising start control means for generating a start signal when said card is manually selectively inserted a predetermined distance along a means defining a path within said apparatus;

reading means including means for producing a light beam and photoelectric means aligned relative to said light producing means positioned along said means defining a path and responsive to said start signal for converting said stored information into a digital electrical signal having characteristics determined by the rate said card is manually transported therepast along said means defining a path;

said start control means being operatively coupled to said reading means and further comprising means for enabling said light producing means in response to said start signal to generate said light beam as said punched card is manually transported by withdrawal from said card reader.

a first photoresponsive means capable of generating said start signal as an electrical start signal when said punch card is in read position:

first amplifying means operatively coupled to said first photoresponsive means for amplifying said electrical start signal:

a flip-flop operatively coupled to said amplifying means for being driven into its set state when said amplified electrical start signal is applied thereto;

an AND gate operatively coupled to said flip-flop and said stop control means and responsive to said flip-flop being set to enable said reading means; and wherein said step control means includes a second photoresponsibe means capable of generating said stop signal as an electrical stop signal when said punched card has been manually transported past said reading means;

second amplifying means operatively connected to said second photoresponsive means for amplifying said electrical stop signal, said second amplifying means being operatively coupled to said AND gate and being capable of disabling said AND gate when said electrical stop signal is produced to disable said reading means and reset said flip-flop to its reset state when said punched card has been manually transported past said reading means; and stop control means including means for disabling said light producing means operatively coupled to said reading means for terminating said light beam and generation of said digital signal in response to said stop signal when the stored information portion of said card has been manually transported past said reading means.

2. An apertured card reader comprising a housing defining a passageway having an inlet and passageway having a dimension to enable an apertured card to be inserted therein:

an inserted card detector adapted for determining when an apertured card having a predetermined orientation is inserted into said inlet:

a start sensing detector located a predetermined distance within said passageway, said start sensing detector being capable of determining when said apertured card has been transported a predetermined distance into said passageway:

a photoelectric reader located within said housing and along said passageway, said photoelectric reader being capable of roading said apertured card by converting stored information therein into electrical signals; and a terminating sensing detector located within said passageway and adjacent said inlet, said terminating sensing detector being capable of determining when a said apertured card has been transported along said predetermined distance past said photoelectric reader; and electrical control means operatively connected to said start sensing detector, said photoelectric reader and said terminating sensing detector, said electrical controls means including means responsive to signals generated from the presence and absence of apertures in said apertured card defining stored information contained therein for generating electrical timing signals having a period determined by the rate of removal of said apertured card from said reader, said electrical control means being responsive to said start sensing detector to enable said photoelectric reader to read a said apertured card as the stored information portion thereof is transported past said photoelectric reader producing electrical signals representing said stored information together with electrical timing signals generated from said electrical signals and for disabling said photoelectric reader in response to said terminating sensing detector after said apertured card has been transported past said photoelectric reader.

3. The card reader of claim 2 wherein said photoelectric reader includes a light source;

a parabolic reflective member positioned relative to said light source to produce a plurality of parallel light beams forming band of light; and a plurality of photosensitive means positioned in spaced alignment with said parabolic reflective member to have said light beams impinge thereon when the space therebetween is uninterrupted by a part of said apertured card.

4. Apparatus for reading information on a first encoded card and a second encoded card manually transported therein comprising a first housing having a first inlet adapted to receive a first encoded card which is manually transported therein:

first starting control means positioned within said first housing for generating a first start signal in response to said first encoded card being inserted a first direction a predetermined distance in said first housing:

first gating means operatively coupled to said first starting control means and responsive to said first start signal for generating a first read signal:

first reading means operatively coupled to said first gating means and responsive to said first read signal for converting information from said first encoded card to a first digital signal having time spatial characteristics determined by the rate said first encoded card is manually transported thereacross;

first dynamic clocking means operatively coupled to said first reading means for generating timing signals from said first digital signal;

first terminating control means positioned in said first housing adjacent said first inlet for disabling said first reading means in response to said first encoded card traversing past said first reading means a distance equal to the length of that portion of the first encoded card containing said information:

a second housing having a second inlet to receive a second encoded card which is manually transported therein:

a second starting control means positioned within said second housing for generating a second start signal in response to said second encoded card being inserted in a first direction a predetermined distance in said second housing;

a second gating means operatively coupled to said first terminating control means and said second starting control means and responsive to said first terminating control means terminating said first reading means and said second start signal for generating a second road signal;

a second reading means operatively coupled to said second gating means and responsive to said second reading signal for converting information from said second encoded card to a second digital signal having time spatial characteristics determined by the rate said second encoded card is manually transported thereacross;

second dynamic clocking means operatively coupled to said first reading means for generating timing signals from said first digital signal: and second terminating control means positioned in said second housing adjacent said second inlet for disabling said second reading means in response to said second encoded card transversing past said second reading means a distance equal to the length of that portion of the second encoded card containing said information.

5. A digital data collection system capable of converting information stored on apertured cards into digital signals representing said information, said storage system storing said digital signals as digital data on a strip member, said system comprising a first card reader cpable of converting and transmitting information stored on a first set of apertured cards as digital signals as each of said cards is manually transported therein in a predetermined sequence, said first card reader including means for generating a first inhibit signal until said information stored on said first set of apertured cards has been converted into digital signals and said cards are removed from said first card reader;

a second card reader capable of converting and transmitting information stored on a second set of apertured cards as digital signals as each of said cards is manually transported therein in a predetermined sequence, said second card reader including means for generating a second inhibit signal until said information stored on said set of apertured cards has been converted into second digital signals and said cards are removed from said second card reader;

a counter scanning unit operatively coupled to said first card reader and said second card reader capable of receiving said transmitted digital signals and selectively responding to said first and second inhibit signals from said card readers, said counter scanning unit being capable of sampling each of said card units for digital signals in a scanning sequence until an inhibit signal is generated by a said card reader causing said counter scanning unit to stop its scanning sequence and permit digital signals from the card reader generating said inhibit signals to be transmitted to and received by said counter scanner unit;

a digital recorder operatively connected to said counter scanning unit and capable of recording said digital signals as digital data on a strip member;

a recorder counter unit operatively connected to said counter scanning unit and said digital recoder for controlling transmission of digital signals between said counter scanning unit and said digital recorder said recorder counter unit including means for determining an end of a digital signal transmission for a said card reader;

a digital clock for generating digital signals representing time and date; and clock gating means operatively coupled to said recorder counter unit and said digital clock for transmitting said digital signals representing time and date to said digital recorder for recording as digital data on said strip member in cooperation with the digital data recorder on said strip member by said digital recorder representing information stored on said apertured cards;

said digital recorder at the end of each transmission of digital signals from a card reader having recorded on said strip member digital data representing information stored on at least one of said apertured cards read by a card reader and information representing the time and date said stored information was recorded on said strip member.

6. The digital data collection system of claim 5 wherein each of said card readers includes a first generating means for producing a first electrical start signal as one of said set of apertured cards is manually removed from said first card reader;

a first stop generating means for producing a first stop signal after said one card has been read by said card reader;

a first reading means located within said reader and positioned to have the information portion of said one card pass thereby as said one card is manually transported along a predetermined path therein, said first reading means being capable of being enabled to convert stored information in said one card into said first digital signal having characteristics determined by the rate said one card is manually transported therepast and being capable of being disabled when said information has been read from said one card;

a first flip-flop operatively connected to said first start generating means and said first stop generating means and being driven into its set state by said first electrical start signal and into its reset state by said first electrical stop signal;

a first AND gate operatively connected to said first flip-flop and said first stop means enabling first reading means upon said first electrical start signal being generated and for disabling said first reading means when said first electrical stop signal is generated;

a second AND gate operatively connected to said first flip-flop and said first stop means enabling first reading means upon said first electrical start signal being generated and for disabling said first reading means when said first electrical stop signal is generated;

a second AND gate operatively coupled to said first flip-flop for producing said first inhibit signal;

a second control means comprising a second start generator means for producing a second start signal as the other of said set of apertured cards is manually removed from said card reader;

a second stop generating means for producing a second stop signal after said other card has been read by said card reader;

a second reading means located within said reader and positioned to have the information portion of said other card pass thereby as said one card is manually transported along a predetermined path therein, said second reading means being capable of being enabled to convert stored information in said other card into said second digital signal having characteristics determined by the rate said one card is manually transported therepast and being capable of being disabled when said information has been read from said other card;

a second flip-flop operatively connected to said second start generating means and said second stop generating means and being driven into its set state by said second electrical start signal and into its reset state by said second electrical stop signal; and a third control means comprising a third and fourth AND gate operatively connected to said first flip-flop and said second flip-flop responsive to said first flip-flop being driven into its set state and said second flip-flop being driven into its set state, said third and fourth AND gate being responsive to said first flip-flop to generate a first control signal representing a reading said one card only and responsive to said first flip-flop and said second flip-flop to generater a second control signal representing reading of both said one card and said other card.

7. The digital data collection system of claim 6 wherein said third control means includes a first one shot multivibrator responsive to said third AND gate being enabled for generating a partial pulse which is capable of being recorded by said digital recorder; and a second one shot multivibrator responsive to said fourth AND gate being enabled for generating a full pulse which is capable of being recorded by said digital recorder.

8. The digital data collection system of claim 5 wherein said digital recorder is a magnetic tape recorder which includes means for recording six bits of digital information and a parity bit per track on a magnetic tape in a formatcapable of use as an input to a digital computer.

9. A method of collecting stored information from a plurality of apertured card readers comprising the steps of inserting an apertured card into a card reader having a reading means for converting stored information on the apertured card into digital signals capable of being transmitted;

generating an inhibit signal from said card reader when a said apertured card is in reading position;

scanning with a counter scanner each of said card readers until an inhibit signal is generated locking said counter scanning unit in communication with said card reader which is to transmit digital signals;

manually transporting said apertured card within said card reader past said reading means and converting said stored information into digital signals;

controlling by means of a recorder counter transmission of the digital signals from said card reader through said counter scanner unit to a digital recorder;

recording said digital signals as digital data on a strip member;

generating and transmitting to said digital recorder digital signals representing the date and time said apertured card was read by said card reader;

recording said date and time digital signals by said digital recorder on said strip member adjacent said digital data representing said information; and terminating said inhibit signal at the end of said converting sequence enabling said counter scanner unit to begin its scanning sequence.

* * * * *